(Model.) 6 Sheets—Sheet 2.
D. C. STOVER.
MACHINE FOR MANUFACTURING BARBED WIRE FENCES.
No. 250,014. Patented Nov. 22, 1881.

Witnesses:
Louis Kauchu
Charles T. Men

Inventor:
Daniel C. Stover (Model.)

D. C. STOVER.
MACHINE FOR MANUFACTURING BARBED WIRE FENCES.

No. 250,014. Patented Nov. 22, 1881.

Witnesses:
Louis Kaichen
Charles T. Green

Inventor:
Daniel C. Stover (Model.)

D. C. STOVER.
MACHINE FOR MANUFACTURING BARBED WIRE FENCES.

No. 250,014. Patented Nov. 22, 1881.

FIG. 4.

Witnesses:
Inventor:
Daniel C. Stover

(Model.)

D. C. STOVER.

MACHINE FOR MANUFACTURING BARBED WIRE FENCES.

No. 250,014. Patented Nov. 22, 1881.

Witnesses:

Inventor:
Daniel C. Stover

(Model.)

D. C. STOVER.
MACHINE FOR MANUFACTURING BARBED WIRE FENCES.

No. 250,014.

Patented Nov. 22, 1881.

Witnesses=
John C. Dewey
Edwin E. Moore

Inventor=
Daniel C. Stover.
By Thos. H. Dodge.
Attorney.

N. PETERS, Photo-Lithographer, Washington, D. C.

UNITED STATES PATENT OFFICE.

DANIEL C. STOVER, OF FREEPORT, ILLINOIS, ASSIGNOR TO THE WASHBURN & MOEN MANUFACTURING COMPANY, OF WORCESTER, MASSACHUSETTS.

MACHINE FOR MANUFACTURING BARBED-WIRE FENCES.

SPECIFICATION forming part of Letters Patent No. 250,014, dated November 22, 1881.

Application filed September 3, 1880. (Model.)

*To all whom it may concern:*

Be it known that I, DANIEL C. STOVER, of Freeport, in the county of Stephenson and State of Illinois, have invented certain new and useful Improvements in Machines for Manufacturing Barbed Wire for Fencing Purposes; and I do hereby declare that the following is a full, clear, and exact description of the same, reference being had to the accompanying drawings, forming a part of this specification, and in which—

Fig. 8ª represents, upon an enlarged scale, a top or plan view of a portion of one of the metal strips from which the barbs are formed, the same showing how said strip is cut and bent to form the barbs, as hereinafter more fully described.

The nature of my invention consists in a machine for manufacturing barb fence-wire, said machine being so constructed and arranged that two wires are fed forward at stated intervals through the same, a flat metal strip, from which the barbs are cut, being also fed forward at stated intervals at right angles to the main wires, said metal strip cut and bent to form the barbs, the barbs so formed secured upon one of the main wires, and both of the main wires then twisted together to form the finished barb fence-wire by a continuous and automatic operation, as hereinafter more fully described.

To enable those skilled in the art to which my invention belongs to make and use the same, I will proceed to describe it more in detail.

In the drawings, G represents the bed or table upon which the several parts of the machine are arranged and secured, and H H legs or standards upon which it is supported.

Driving-power is imparted to the machine by means of a large driving-wheel or pulley, I, which may be operated by belt-connection with any suitable and convenient driving mechanism. Said driving-pulley I is arranged upon the outer end of a horizontal driving-shaft, J, which is arranged to turn in suitable bearings, J′ J′, formed or secured upon bed G. Upon said driving-shaft J are also secured cam K, bevel-gear L, cam M, and small spur-gear N. Cam K operates a rocking lever, O, which is provided with an angular-shaped head, O′, in which the barb-cutters are arranged and secured, as hereinafter described. Bevel-gear L operates the barbing portion of the machine, and cam M and spur-gear N operate the mechanism which feeds the main wires forward through the machine. Rocking lever O is pivoted at each side upon short pointed shafts or spindles $a\, a$, which may be adjusted in or out of bearings $O^2\, O^2$, and secured after such adjustment by means of set-screws $b\, b$, screws $c\, c$, and holding-nuts $d\, d$. The inner pointed ends of short shafts or spindles $a\, a$ are made conical-shaped, and the ends of the laterally-projecting arms $O^3\, O^3$ of rocking lever O are provided with similar-formed openings to receive them, as represented by dotted lines in Fig. 1 of the drawings.

Figure 1:
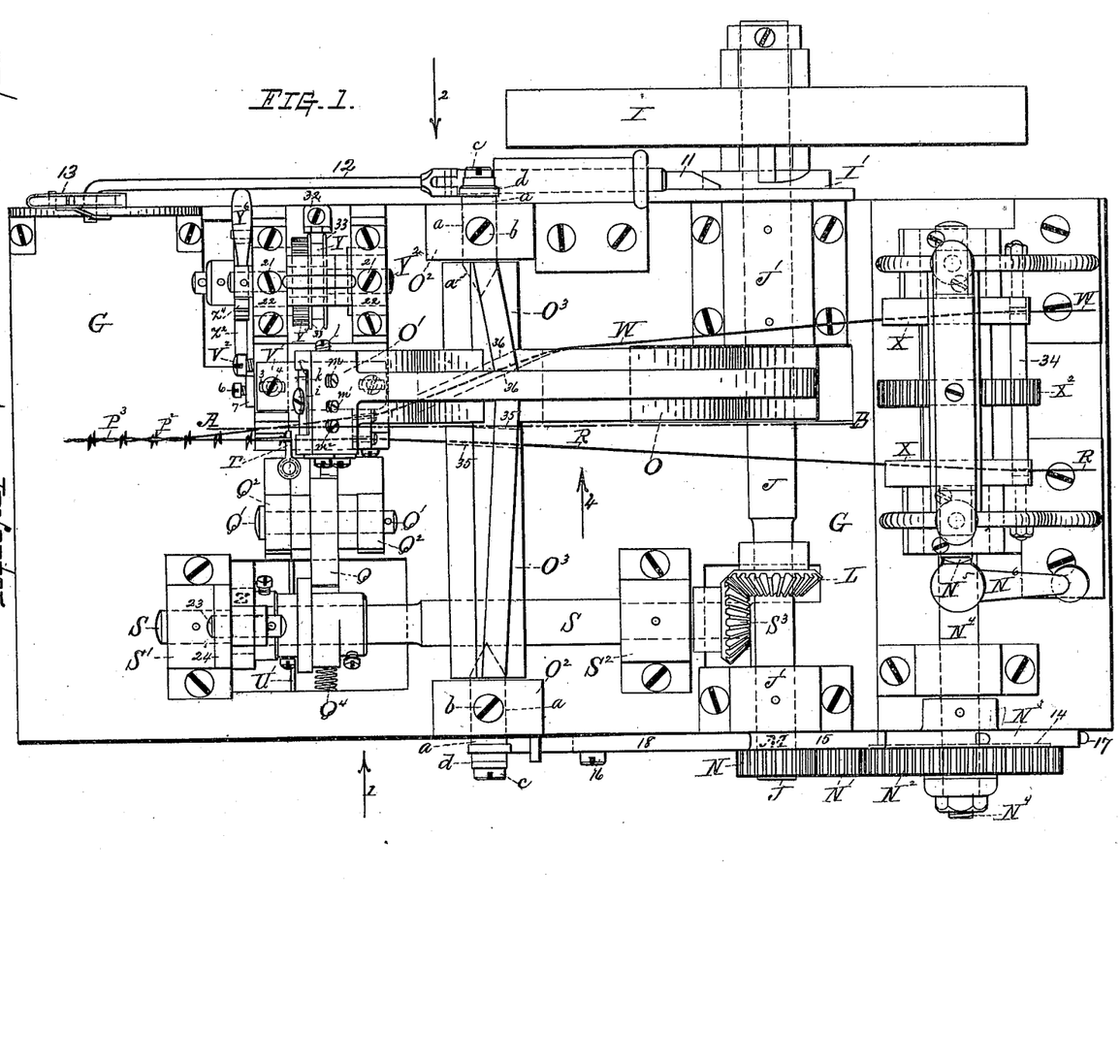
Figure 1 represents a top or plan view of my aforesaid improved barbed-fence machine, which will be hereinafter more fully described.
Figures 2, 8, 8A, 9:
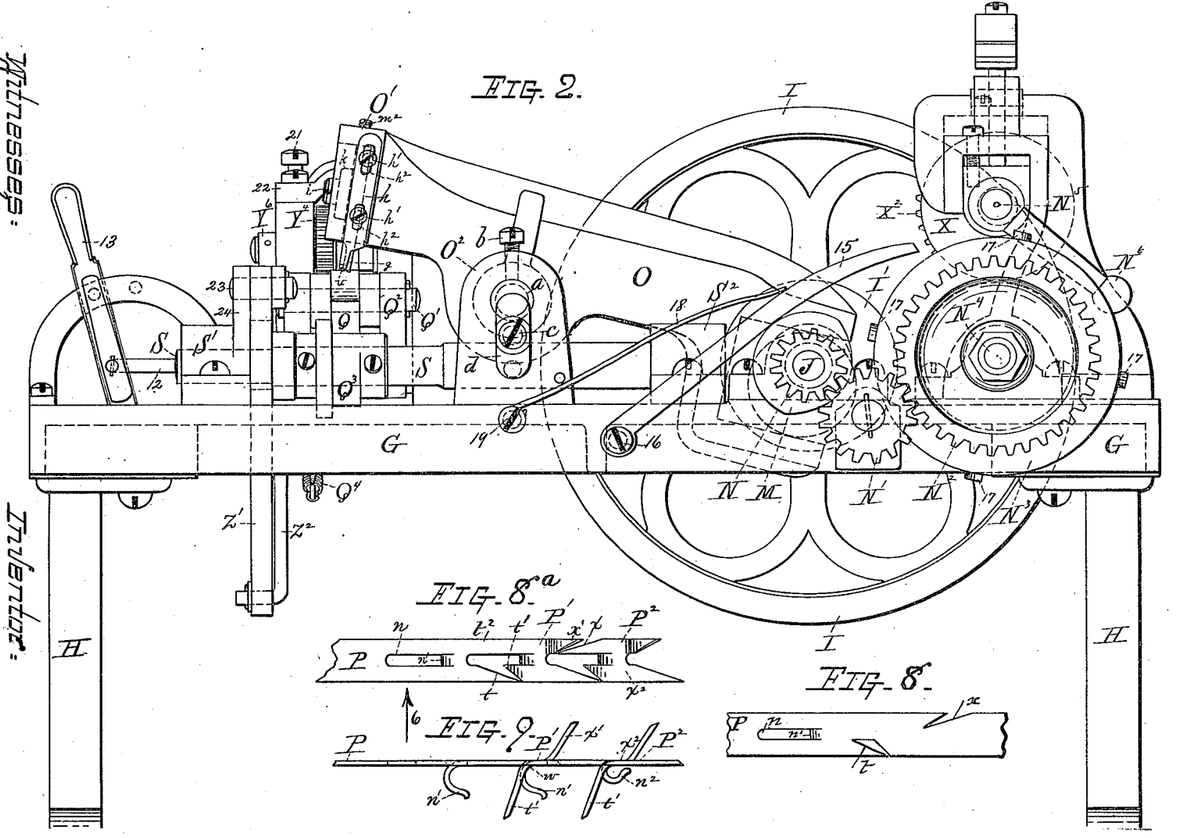
Fig. 2 represents a side view of the machine shown in Fig. 1, looking in the direction indicated by arrow 1, same figure.
Fig. 8 represents, upon an enlarged scale, a top or plan view of a portion of one of the metal strips from which the barbs are formed, the same showing how said strip is cut by the first and second cutters.
Fig. 9 represents an edge view of the metal strip shown in Fig. 8, looking in the direction of arrow 6.
Figure 4:
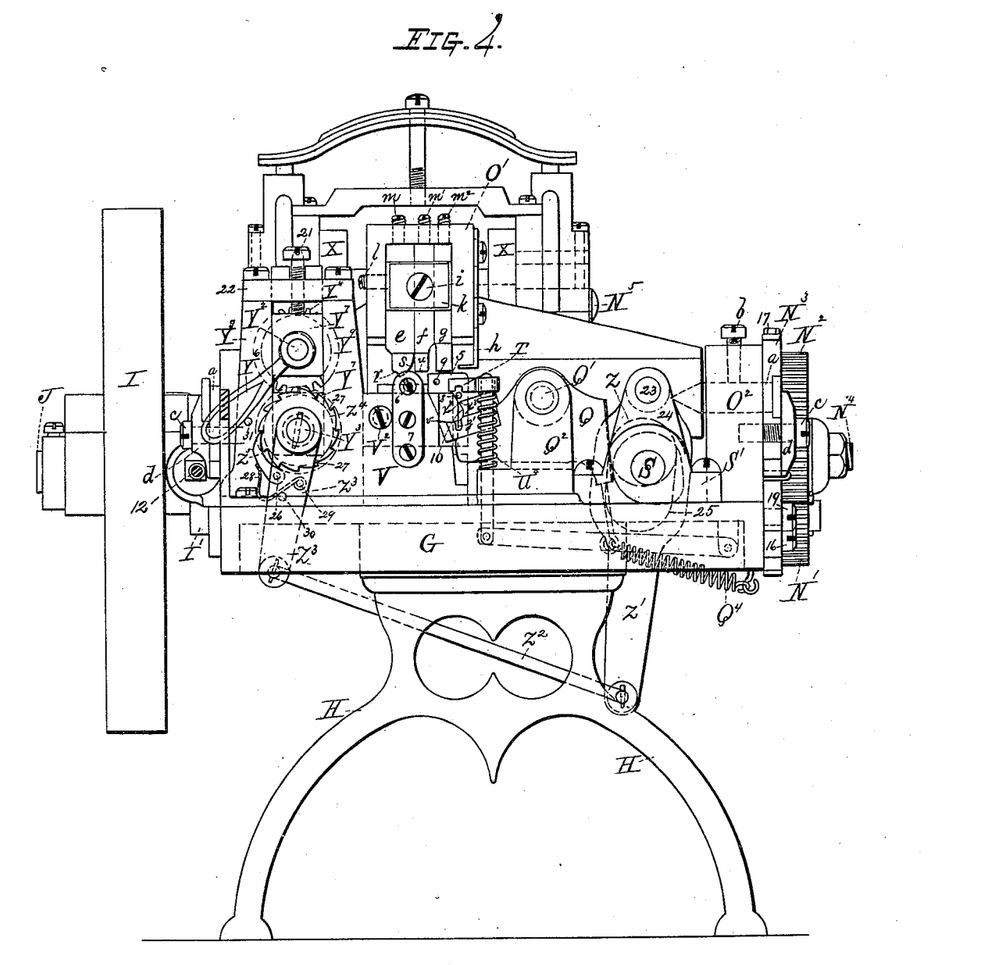
Fig. 4 represents an end view of the machine, looking in the direction indicated by arrow 3, Fig. 1.
Figure 5:
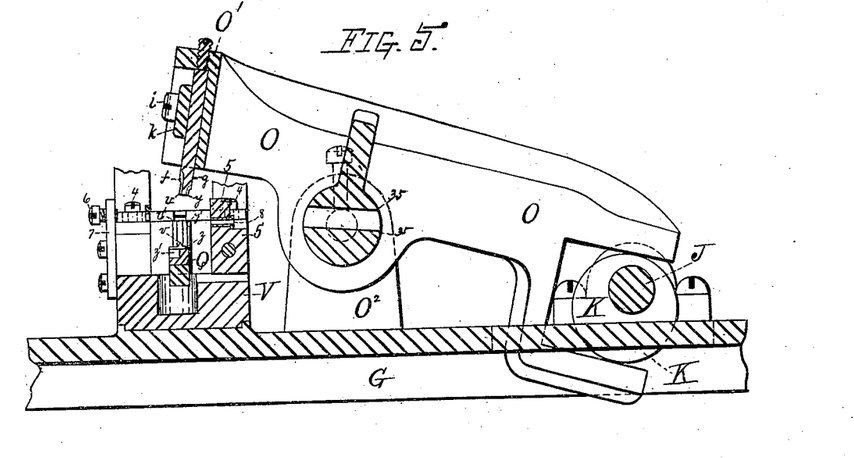
Fig. 5 represents a vertical longitudinal section through a portion of the machine hereinafter described, taken on line A B, Fig. 1, looking in the direction indicated by arrow 4, same figure.
Figure 12:
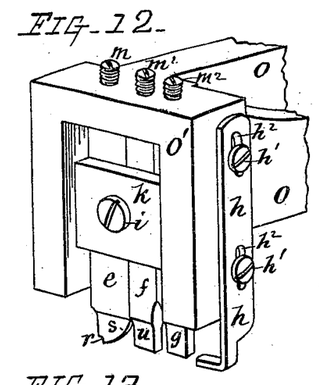
Fig. 12 represents a perspective view of the head of the rocking lever carrying the cutters.
Figures 13, 14, 16, 17:
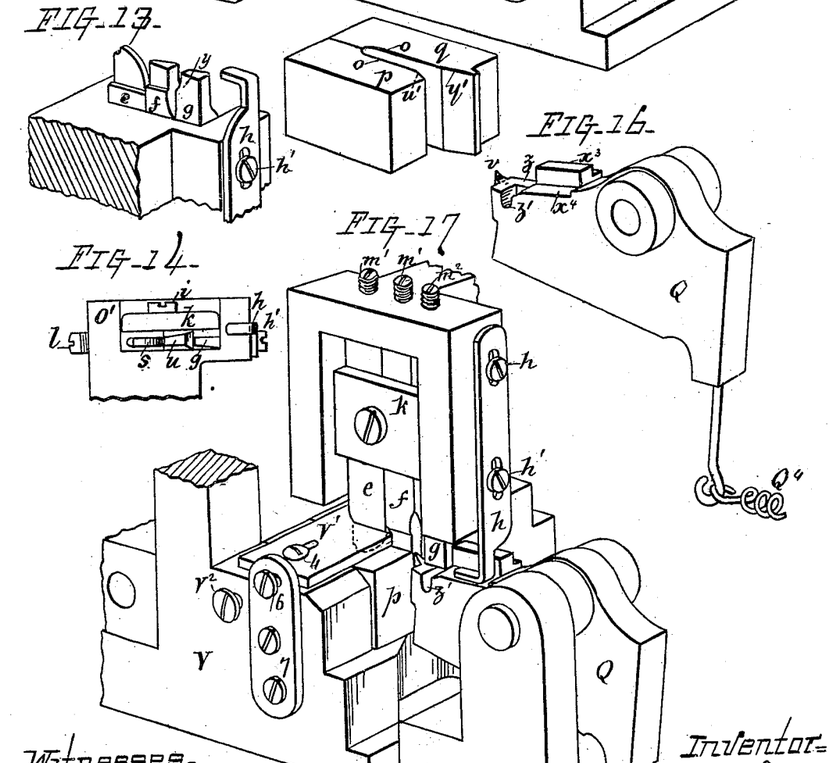
Fig. 13 represents, in perspective, a bottom view of a portion of said lever-head and cutters.
Fig. 14 represents a bottom view of the same, to show the relative arrangement of the cutters.
Fig. 16 represents, in perspective, a rocking arm to be used under one of the cutters of the cutter-head.
Fig. 17 represents, in perspective, a portion of the cutter-head and frame, and also the rocking arm in working position.
Figure 15:
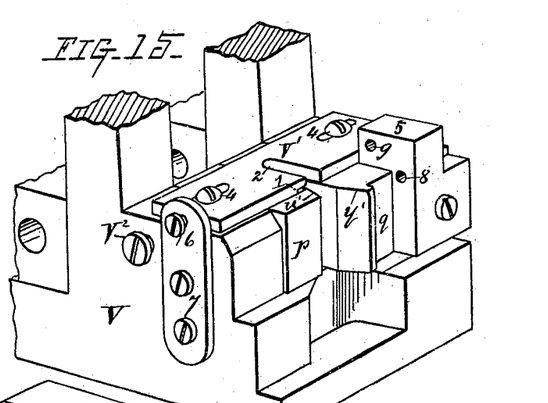
Fig. 15 represents, in perspective, a portion of the frame and lower cutting-dies of the machine.

By the foregoing arrangement it will be seen that rocking lever O and its barb cutters may be easily and conveniently adjusted laterally, considerable play between bearings $O^2\, O^2$ being allowed for that purpose, as represented by Fig. 1. The rear end of rocking lever O, as will be seen by Figs. 2 and 5, is made fork-shaped, so as to fit over and receive the action of its operating-cam K, while its forward end or head, $O'$, is made of the proper form to receive and hold the barb-cutters $e\, f\, g$ and holder $h$, as indicated in Figs. 4, 5, and 12. The cutters $e$, $f$, and $g$ are rigidly held in head $O'$ by means of a screw, $i$, holding-plate $k$, and screw $l$, and they may be adjusted vertically by the operation of said screws $i$ and $l$ and screws $m$ $m'\, m^2$, the latter being fitted to turn up and down in the top of head $O'$, as represented by dotted lines in Fig. 4 of the drawings.

The cutter $e$ forms the cut $n$ in the metal strip P (see Fig. 8) by the cutting-edges of said cutter passing by the cutting-edges $o$ of die-blocks $p\, q$. (See Fig. 6.) At the same time that cut $n$ is formed the part $n'$ is bent down by the end of the cutter, as represented in Fig. 9, by the lower end of said cutter $e$ being notched, as shown at $r$, and curved, as shown at $s$, Fig. 4, of the drawings.

Cutter $f$ forms the cut $t$ in strip P by the cutting-edge $u$ of said cutter and the cutting-edge $u'$ of die-block $p$. As the cut $t$ is formed the part $t'$ (which forms one of the points of the next preceding barb, $P'$) is bent down by the end of the cutter into the position represented in Fig. 9, the body of the barb being supported so that such a bend may be made by the pointed end $v$ of the rocking part Q bearing upon the under side of the unfinished barb $P'$ at the point $w$.

The cut $x$ in strip P, which separates the finished barb $P^2$ from the next succeeding unfinished barb $P'$, is made by the cutting-edge $y$ of cutter $g$ and the cutting-edge $y'$ of die-block $q$. As said cut $x$ is formed the point $x'$ of barb $P'$ is bent up, as represented in Fig. 9, by the end $x^3$ of rocking part Q, when the latter is operated as hereinafter described, the body of the barb being at the same time forced down by the end of the cutter. The part $n'$ of the finished barb is also at the same time bent around the main wire R, as represented at $n^2$, Fig. 9, so as to secure it upon the same, by said barb being pressed between the lower end of cutter $g$ and the surface $z$ of rocking part Q when said parts are in operation.

Thus it will be seen from the foregoing description and Figs. 8 and 9 of the drawings that a portion of two barbs are formed and the first preceding barb is separated from the strip and secured upon the main wire R at each operation of the barbing mechanism. The unfinished barb $P'$ not being cut or separated at the point $t^2$ from the barb-strip P enables it by such connection to be fed forward by the strip between the wires R W into the position occupied by barb $P^2$ preparatory to being separated from said strip and secured upon wire R at the next operation of the cutters, as before described.

During the operation of securing the finished barb $P^2$ upon wire R the lower bent end of barb-holder $h$ (see Fig. 4) rests upon said barb at the point $x^2$, and holds it firmly in position between the same and the surface $x^4$ of rocking part Q. Said barb-holder may be adjusted up or down by means of screws $h'\, h'$, slots $h^2\, h^2$ being formed in the holder for that purpose. As the downwardly-projecting point $t'$ of barb $P^2$ would be in the way during the barbing operation, a slot or recess, $z'$, is formed in rocking part Q to receive it. Rocking part Q is pivoted upon a pin, $Q'$, which passes through the upper parts of standards $Q^2\, Q^2$, and is operated by means of a cam, $Q^3$, which is secured upon a horizontal driving-shaft, S, fitted to turn in bearings $S'\, S^2$, and turned by bevel-gear L through bevel-gear $S^3$. The bearing-surface of rocking part Q is kept against the surface of its cam $Q^3$ by a spiral spring, $Q^4$, secured at one end to the frame-work of the machine, and at the other end to the lower end of said rocking part Q.

In order that the barb-strip P may be fed forward over the wire R, the latter is drawn down by a notched finger, T, which is operated by a cam, U, secured on shaft S, through link-piece $U'$, cam-bearing piece $U^2$, secured upon said link-piece, and spindle $U^3$, to the upper end of which the aforesaid notched finger T is secured. Said holding-finger T is sprung up when released by its operating-cam by means of a spiral spring, $U^4$, arranged over spindle $U^3$.

The die-blocks $p$ and $q$ are retained in position in holding-block V by means of an adjustable top holding-plate, $V'$, and a set-screw, $V^2$. Adjustable plate $V'$ not only serves to assist in holding the dies in position, but also serves as a guide to properly direct the barb-strip P forward over wire R, a slot, 1, (see Fig. 7,) being formed in the same, of the proper dimensions to allow said strip to pass through. Said plate $V'$ is slotted, as represented at 2, so that cutters $e$ and $f$ may act on the cutting-edges of the dies, under the same, and at 3 3, to allow of its adjustment. It is held in position after adjustment by screws 4 4, guide-block 5, which is secured to block V, and by a set-screw, 6, which turns in a plate, 7, also secured to block V. Guide 5 is provided with two guiding-tubes, 8 and 9, through which the wires R and W pass, and are properly guided forward under rocking head O', to where they are twisted together, as hereinafter more fully described. Wire R passes through opening 8, under the barb-strip P, as before stated, between the end of die $q$ and the circular part 10 of rocking part Q, while wire W passes through opening 9 over said barb-strip, and thence between cutters $f$ and $g$.

Figures 3, 10, 11:
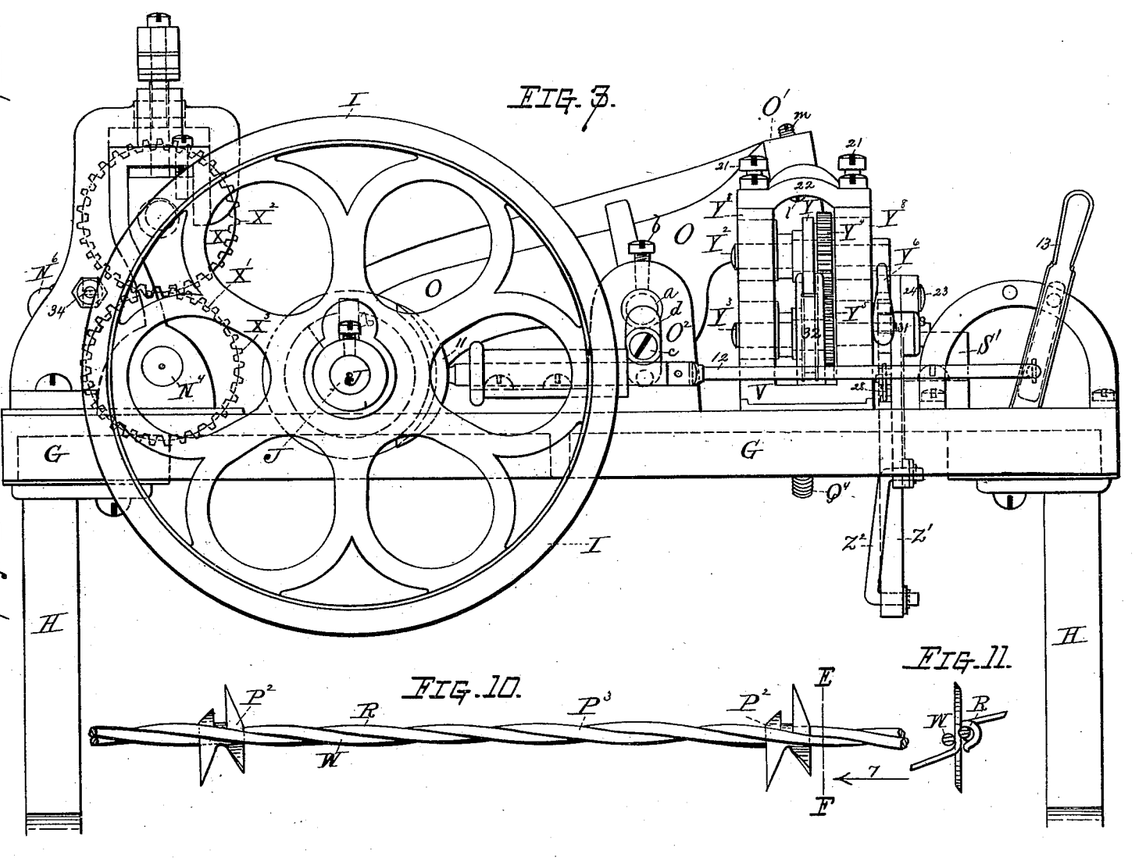
Fig. 3 represents an opposite side view of the machine from that shown in Fig. 2, as indicated by arrow 2, Fig. 1.
Fig. 10 represents a section of finished barbed fence-wire, (full size,) such as is manufactured by my aforesaid barb-fence machine.
Fig. 11 represents a section through said fencing shown in Fig. 10, taken on line E F, looking in the direction of arrow 7 of said Fig. 10.

The main wires R and W are fed forward into and through the machine by means of feed-rolls X X X' X', which are operated by spur-gear N on shaft J, through spur-gears $N' N^2$, disk $N^3$, horizontal shaft $N^4$, and spur-gears $X^2 X^3$. The upper feed-rolls, X X, and their gears $X^2 X^2$ are arranged loosely upon an eccentric-shaft, $N^5$, as represented by dotted lines, Figs. 2 and 3 of the drawings. Therefore, by turning the hand-lever $N^6$ (which is secured to the end of said eccentric-shaft) up or down, the upper feed-rolls may be raised, so as to insert wires R W between them, or lowered, so as to produce a pressure upon the same to feed them forward when said rolls are in operation.

The shipping and unshipping mechanism of the machine may be of ordinary construction, arrangement, and operation, and therefore requires no detailed description, an ordinary clutch, 11, operated by a connecting-rod, 12, and hand-lever 13, being in this instance employed for the purpose, which locks and unlocks the hub of the main driving-wheel I to or from a notched wheel or disk, I', which is secured to shaft J.

The feed-rolls are stopped at stated intervals to allow of the barbing operation, and turned so as to feed the wires R and W forward the distances that the barbs are required to be secured apart upon wire R, in the following manner: Spur-gear $N^2$ is fitted loosely upon shaft $N^4$, while disk $N^3$ is secured upon said shaft, and a leather or other frictional washer, 14, (shown by dotted lines, Fig. 1,) is placed between them in a recess formed in said disk. Said washer 14 is for the purpose of producing a friction, so that they may both be turned together or independently of each other, as hereinafter described.

During the barbing operation the feed-rolls are stopped, so that they will not feed forward wires R W, by means of a pawl or lever, 15, pivoted at 16, catching against one of the cogs 17, which are formed or secured upon the periphery of disk $N^3$. Said pawl or lever is held down upon the surface of disk $N^3$ by means of a flat spring, 18, secured at 19, and is forced up so that cogs 17 will pass by its end without catching by means of cam M, secured upon shaft J. Cam M is of the proper form, and cogs 17 at the proper distances apart, to stop and feed forward wires R W as required, and at the proper time to act in unison with the barbing mechanism of the machine. Said barbing mechanism is constructed, arranged, and operates in the following manner:

The strip P, from which the barbs are formed, is fed into the machine by means of feed-rolls Y Y', which are operated by cam Z, secured upon shaft S, through slotted swinging arm Z', connecting-rod $Z^2$, crank-lever $Z^3$, ratchet-wheel $Z^4$, its pawl $Z^5$, shafts $Y^2 Y^3$, and spur-gears $Y^4 Y^5$. The upper feed-roll, Y, is raised and lowered by means of an eccentric-shaft, $Y^2$, and hand-lever $Y^6$, in the same manner that feed-roll X is raised and lowered, as before explained. Shafts $Y^2$ and $Y^3$ are arranged to turn in suitable bearings, $Y^7 Y^7$, which are loosely fitted in standards or housings $Y^8 Y^9$, formed or secured on block V. The bearings of the upper eccentric-shaft, $Y^2$, are provided with circular recesses in their upper sides, (see Fig. 6,) in which rubber or other springs 20 are arranged, and adjustable screws 21, that pass through cap-piece 22, which is secured to the tops of housings $Y^8 Y^9$, bear upon the tops of said rubber springs. By this arrangement it will be seen that a slight upward springing motion is given to the upper feed-roll, thereby enabling it to adjust itself to different thicknesses of strips P, and to allow bunches and other defects in said strips to pass between the rolls without injury to them or adjoining parts. A greater or less pressure may be produced upon the strip by turning adjusting-screws 21 21 up or down.

Swinging arm Z' is hinged upon a pin, 23, which is secured in the upper end of a standard, 24, formed upon bearing S', and the opening or slot in said swinging arm (shown by dotted lines 25, Fig. 4) is made of the proper size and form to fit over and receive the action of its operating-cam Z.

The several parts of the feeding mechanism are so constructed and arranged as to turn the feed-rolls Y Y', and to stop the same at stated intervals, the strip P being fed forward a sufficient distance to form the barbs, and then stopped while the same are being secured upon wire R, as before described.

Pawl $Z^5$, which is pivoted at 26 to crank-lever $Z^3$, is held against ratchet-wheel $Z^4$, so as to catch into notches 27, by means of a wire or other spring, 28, (also attached to crank-lever $Z^3$ at 29,) and pin 30, against which said spring bears.

Hand-lever $Y^6$ is prevented from striking or resting upon the surface of ratchet-wheel $Z^4$ by a pin, 31, secured in the side of standard $Y^8$.

The strip P is properly guided forward between the feed-rolls Y Y' by a guide, 32, and prevented from slipping out from between said rolls by flanges 33 33, which are formed around the outer edges of the periphery of the lower feed-roll, Y'.

Figures 6, 7:
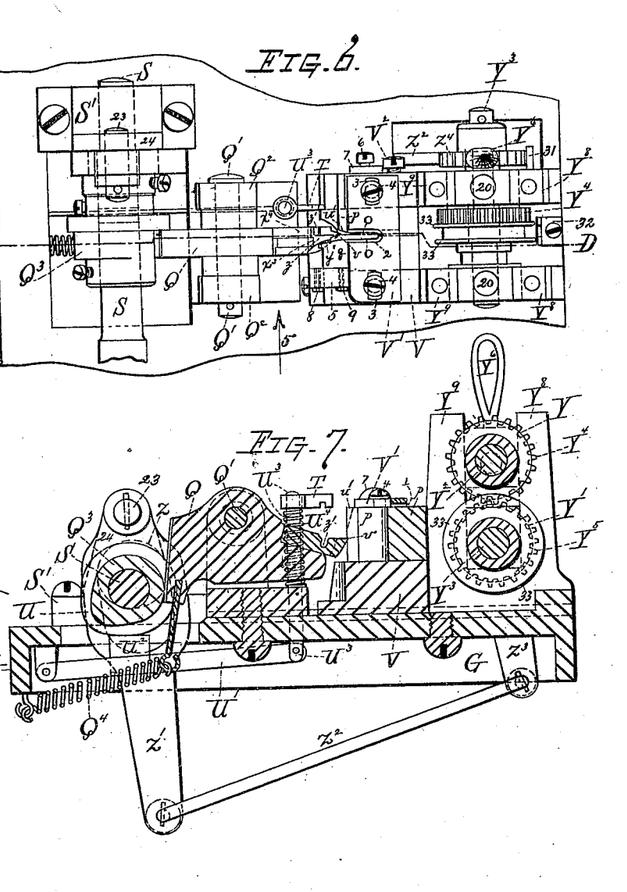
Fig. 6 represents a top or plan view of the barbing portion of the machine, which will be hereinafter more fully described.
Fig. 7 represents a vertical longitudinal section through the parts shown in Fig. 6, taken on line C D of said Fig. 6, looking in the direction indicated by arrow 5.

In Figs. 6 and 7 cap-piece 22 is left off, as well as rocking lever O, and other parts not connected with the barbing portion of the machine, for the purpose of illustrating said parts more fully.

The wires R W and strip P are drawn from reels arranged at a convenient distance from the machine, said reels being arranged to turn upon suitable standards or frames.

In all the drawings the several parts of the machine are shown in the positions that they occupy just after the barb-strip P has been fed forward, and just as the cutters are commencing to descend to form the cuts and bends, (shown in Figs. 8 and 9,) and to secure the barb P² upon wire R, as before described.

It will be observed that my machine can be used in the manufacture of barbed wire, the barbs of which are made from sheet-metal strips, even if the tongue n' is omitted altogether. The machine may be constructed and arranged so as to secure barbs P² upon wire R at a greater or less distance apart, as desired.

Having described the several parts of the machine in detail, the operation of the same may be briefly summed up thus: The attendant first raises feed-rolls X X off of feed-rolls X' X' by means of hand-lever N⁶, as before described, when he then passes the ends of wires R W into and through openings formed in a guide-bar, 34, secured in front of the feed-rolls; thence between said feed-rolls. He now takes hold of the end of wire R or W from the other side of the rolls—we will suppose it to be wire R, in this instance—and draws it forward, and passing it through an opening formed in the arm O³ of rocking lever O, (shown by dotted and full lines 35 35, Figs. 1 and 5,) he then draws it forward again and passes it into and through tube 8 in guide 5, thence forward, as before described, to the twisting-machine, and there secures it to one of the arms of the spool or reel of said twisting-machine, which may be of ordinary construction. The wire W is now drawn forward in the same manner as wire R, and passed through an opening formed in the rocking lever O, (shown by dotted lines 36 36, Fig. 1,) thence through tube 9 in guide 5, and forward, as before described, and also secured to one of the arms of the twisting-machine spool or reel. The rolls X are then lowered, so as to press upon the wires. The attendant now raises feed-roll Y by means of hand-lever Y⁶, as before explained, and then, taking the end of barb-strip P, passes it through the slot formed in guide 32; thence on between feed-rolls Y Y', under adjustable plate V', under wire W, and over wire R a sufficient distance to form the cuts and bends. (Shown in Figs. 8 and 9.) Feed-roll Y is now lowered, so as to press upon the barb-strip, when the attendant starts up the machine by means of hand-lever 13, as before explained, thereby feeding the main wires R W forward the distance that the barbs are secured apart, then stopping for the barb-strip P to be fed forward and the barbs P² to be cut, bent, and secured upon wire R by a continuous and automatic operation. As wires R W are fed forward with the barbs P² secured upon wire R, said wires are interlocked or intertwisted to form one main wire, P³, (see Figs. 1 and 10,) by a suitable twisting-machine provided for the purpose, which machine at the same time coils the finished fence-wire upon the reel or spool arranged upon the same, thereby leaving it in proper form for the market.

Having described my improvements in machines for manufacturing barbed fence-wire, what I claim therein as new and of my invention, and desire to secure by Letters Patent, is—

1. In a wire-barbing machine, the combination of the main shaft J and cam K thereon with rocking lever O, having its rear end forked, the slot being in the same vertical plane of the lever, and its head O' recessed for holding barb-cutters and a holding-plate, k, within the recess, substantially as described.

2. In a wire-barbing machine, the combination of the bed-plate G, having bearings J' and O², main shaft J, and cam K thereon, with rocking lever O, laterally-projecting arms O³ thereof, adjustable spindles a a, holding-screws b, set-screws c, and holding-nuts d, as and for the purpose set forth.

3. The combination, with the head O' of the rocking lever O, of adjustable barb-holder h, secured to the side of the head, cutters e f g, holding-plate k, secured by screw i, and cutter-clamping side screw, l, as and for the purposes set forth.

4. The combination of the head O' of rocking lever O and cutter e, having its cutting end semicircular, with the die-blocks p q, having cutting-edges o to receive the cutters, as and for the purpose set forth.

5. The combination of the rocking-lever head O', cutter e, having its cutting end semicircular, and cutter f, made with a flat cutting-face, with die-blocks p q, having cutting-edges o and u', as and for the purpose set forth.

6. The combination of the rocking-lever head O', cutter f, secured thereto, die-block p, having the edge u', with rocking part Q, having a pointed end, v, as and for the purpose set forth.

7. The combination of the rocking-lever head O' and cutter g, secured thereto, with die-block q, having edge y', and rocking part Q, having part x³, as and for the purpose set forth.

8. The combination of the rocking-lever head O', cutter g, secured thereto, with rocking part Q, provided with top z, as and for the purpose set forth.

9. The combination of the rocking-lever head O', cutter g, secured thereto, and barb-holder h, bent at its lower end, with under die or supporting part, x³, of rocking part Q, as and for the purposes set forth.

10. The combination, with the rocking support Q and the rocking-lever head O', of slotted barb-holder h and screws h', as and for the purpose set forth.

11. The combination, with bed-plate G, having standards Q², to receive pin Q', of rocking part Q, operated by cam Q³ on shaft S at right angle to the main driving-shaft, as and for the purpose set forth.

12. The combination, with bed-plate G, having standards Q², to receive pin Q', of rocking part Q, operated by cam Q³ on shaft S at right angle to the main driving-shaft, and retracted by spring Q⁴, as and for the purpose set forth.

13. The combination, with a guide-block and rocking part Q, provided with groove z', of the notched finger T, spring U⁴, cam U, shaft S, link-piece U', cam-bearing piece U², and spindle U³, as and for the purpose set forth.

14. The combination, with a guide-block and rocking part Q, having groove z', of the notched holding-finger T and spring U⁴, upon which it rests in front of part Q, as and for the purpose set forth.

15. The combination of the rocking-lever head O', carrying cutters e f, with die-blocks p and q of holding-block V, slotted holding-plate V', and set-screws 4 and V², as and for the purposes set forth.

16. The combination of the rocking-lever head O', carrying cutters e f, and plate V', provided with slot 1 and capable of adjustment with screws 4, as and for the purpose set forth.

17. The combination, with wire-barb cutters and dies, constructed substantially as described, of the block V, plate V', guide-block 5, set-screw 6, and plate 7, as and for the purpose set forth.

18. The combination, with wire-barb cutters and dies, constructed substantially as described, of guide-blocks 5 and tubes 8 and 9 in said guide-blocks, as and for the purpose set forth.

19. The combination of the feed-rolls X X' of a wire-barbing machine with gear N on main driving-shaft J, gears N' N², leather washer 14, horizontal shafts N⁴ N⁵ parallel with the main shaft, and spur-gears X² X³, as and for the purpose set forth.

20. The combination of the main driving-shaft J of a wire-barbing machine, shaft N⁴ parallel therewith, lever 15, and spring 18, with cam M on shaft J, and disk N³, secured to shaft N⁴, and provided with cogs or stops 17, as and for the purpose set forth.

21. In a wire-barbing mechanism, as described, the combination of the eccentrically-mounted feed-rolls Y Y', hand-lever Y⁶, standards Y⁸, and stop-pin 31 with cam Z, slotted swinging arm Z', connecting-rod Z², crank-lever Z³, ratchet-wheel Z⁴, and pawl Z⁵, for controlling and feeding a strip of sheet metal at right angle to the wires, as set forth.

22. The combination, with feed-rolls Y Y', of guide 32, flanges 33, ratchet-wheel Z⁴, spring-pawl Z⁵, and pin 30, as and for the purposes set forth.

23. The combination, in a machine for making barbed fencing, of mechanism for feeding forward two or more main wires at stated intervals, mechanism for feeding forward a strip of metal at stated intervals, with mechanism for forming the barbs by a series of cutting and bending operations performed successively, and with mechanism for intertwisting the barbs with the main wires, substantially as described.

24. The process of making barbed fencing from two strands of wire and a metal strip, consisting of feeding said strip at right angle to the course of the wires and partly forming the cuts and bends in the metal strip before reaching said wires, advancing it between the wires in an incomplete state, and locking it to one of the wires, substantially as described.

25. The combination of mechanism constructed and arranged substantially as above described—that is, a rocking lever carrying two differently-shaped cutters operating against stationary dies, a stationary die, and a rocking part, with two series of feed-rolls, the shafts of one series being at right angle to the other, with mechanism operating each series and the rocking levers intermittingly, all connected to the main shaft, for manufacturing, through power applied continuously to the main shaft, barbed wire composed of two longitudinal wires and sheet-metal barbs, substantially as shown and described.

DANIEL C. STOVER.

Witnesses:
  LOUIS KARCHER,
  CHARLES T. GREEN.